(12) United States Patent
Chen et al.

(10) Patent No.: US 8,467,001 B2
(45) Date of Patent: Jun. 18, 2013

(54) VIDEO SYSTEM CAPABLE OF CONTROLLING AMBIENT LIGHT AND CONTROL METHOD THEREOF

(75) Inventors: Chien-Chou Chen, New Taipei (TW); Wen-Kang Wei, New Taipei (TW)

(73) Assignee: AmTRAN Technology Co., Ltd., New Taipei (TW)

( * ) Notice: Subject to any disclaimer, the term of this patent is extended or adjusted under 35 U.S.C. 154(b) by 74 days.

(21) Appl. No.: 13/236,165

(22) Filed: Sep. 19, 2011

(65) Prior Publication Data
US 2013/0021527 A1 Jan. 24, 2013

(30) Foreign Application Priority Data
Jul. 20, 2011 (TW) .............................. 100125697 A

(51) Int. Cl.
*H04N 11/00* (2006.01)
*H04N 5/44* (2006.01)
(52) U.S. Cl.
USPC .......................................... 348/552; 348/460
(58) Field of Classification Search
USPC ................. 348/552, 553, 602, 603, 739, 564, 348/460
See application file for complete search history.

(56) References Cited

U.S. PATENT DOCUMENTS

| | | | |
|---|---|---|---|
| 6,611,297 B1 * | 8/2003 | Akashi et al. ................. | 348/739 |
| 7,071,897 B2 * | 7/2006 | Bronson ........................... | 345/7 |
| 7,385,759 B2 * | 6/2008 | Pasternak et al. ............. | 359/429 |
| 7,616,262 B2 * | 11/2009 | Eves et al. ...................... | 348/553 |
| 7,861,257 B2 * | 12/2010 | Park et al. ....................... | 725/28 |
| 7,894,000 B2 * | 2/2011 | Gutta et al. ................... | 348/603 |
| 8,212,931 B2 * | 7/2012 | Chen et al. .................... | 348/602 |
| 2005/0041161 A1 | 2/2005 | Dowling et al. | |
| 2006/0058925 A1 * | 3/2006 | Diederiks et al. ............. | 700/291 |
| 2007/0081101 A1 * | 4/2007 | Diederiks et al. ............. | 348/602 |
| 2009/0289874 A1 * | 11/2009 | Ha ................. | 345/1.3 |
| 2010/0005062 A1 | 1/2010 | Van Den Dungen | |
| 2010/0052548 A1 * | 3/2010 | Allard et al. ................... | 315/154 |
| 2010/0289666 A1 * | 11/2010 | Hardacker et al. ....... | 340/815.45 |

* cited by examiner

*Primary Examiner* — Victor Kostak
(74) *Attorney, Agent, or Firm* — Muncy, Geissler, Olds & Lowe, PLLC

(57) ABSTRACT

A video system suitable for being set in one of several scene modes and controlling one of several ambient light sources is disclosed. The video system includes a storage unit, a signal transceiver, and a control module. The storage unit stores several brightness setting values, in which the brightness setting values correspond to the scene modes and/or several specification data respectively, and the specification data is contained in the several ambient light sources respectively. The signal transceiver is used for receiving the specification data of one of the ambient light sources. The control module is electrically coupled to the signal transceiver, and controls the signal transceiver to transmit a corresponding brightness setting value in the storage unit to the ambient light source according to the set scene mode and the received specification data.

12 Claims, 4 Drawing Sheets

VIDEO SYSTEM CAPABLE OF CONTROLLING AMBIENT LIGHT AND CONTROL METHOD THEREOF

CROSS-REFERENCE TO RELATED APPLICATIONS

This non-provisional application claims priority under 35 U.S.C. §119(a) on Patent Application No(s). 100125697 filed in Taiwan, R.O.C. on Jul. 20, 2011, the entire contents of which are hereby incorporated by reference.

BACKGROUND

1. Field

The disclosure relates to a video system and a control method thereof, and more particularly to a video system capable of performing two-way information exchange with an ambient light source and a control method thereof.

2. Related Art

Several types of play mode settings are built in a common television (TV), and each play mode setting represents a set of default parameter values including, for example, brightness, contrast, color temperature, sharpness, and sound effects. When watching different TV programs, a user can directly select a favorable play mode on a display menu in the TV to achieve an optimal effect of video watching.

However, according to the above-mentioned play mode settings, only the TV hardware is adjusted, but the other ambient conditions are unchanged. For instance, if the user wants to watch TV in a dark environment, the user must manually turn off the indoor lighting in the beginning, and then turn on the indoor lighting after finishing watching TV. In order to improve the overall entertainment effect when the user watches TV, the US Published Application 2010/0005062 sets forth a video system capable of automatically adjusting an ambient light source controls ambient light brightness around a display to simulate different scenes.

Although the method for controlling the ambient light source is disclosed in the prior art, the video system and the ambient light must be furnished according to the manuals of the video system and the ambient light, and the parameter values must be set in advance to meet the requirements of the scene simulation. When the ambient lighting is damaged, it must be replaced by an illumination light source with different specifications and the user must readjust the parameter values to make the video system operate correctly. Therefore, the method for controlling the ambient light source disclosed in the prior art is inconvenient in use and results in further restrictions on the application of the video system.

SUMMARY

In view of the above-mentioned technical problems, a video system and a control method thereof are disclosed. The video system is suitable for being set in one of several scene modes and controlling one of several ambient light sources. The video system can communicate with the ambient light source, and after receiving information of the ambient light source, responsively controls the luminous intensity of the ambient light source, so as to solve the problem in the prior art.

An embodiment of the disclosure discloses a video system, suitable for being set in one of several scene modes and controlling one of several ambient light sources. The video system comprises a storage unit, a signal transceiver, and a control module. The storage unit stores several brightness setting values and the brightness setting values correspond to the scene modes and/or several specification data respectively. The specification data is contained in the several ambient light sources respectively. The signal transceiver is used for receiving the specification data of one of the ambient light sources. The control module is electrically coupled to the signal transceiver. The control module controls the signal transceiver to transmit a corresponding brightness setting value in the storage unit to the ambient light sources according to the set scene mode and the received specification data.

An embodiment of the disclosure discloses a video system which is suitable for being set in one of several scene modes. The video system comprises an ambient light source, a signal transceiver, and a control module. The ambient light source has a storage unit. The storage unit stores several brightness setting values, and the brightness setting values correspond to the scene modes respectively. The control module is electrically coupled to the signal transceiver. The control module controls the signal transceiver to transmit information of the set scene mode to the ambient light source, and the ambient light source sets the illumination intensity to a corresponding brightness setting value according to the information of the set scene mode.

An embodiment of the disclosure discloses a control method of a video system. The video system stores several brightness setting values. The control method includes setting the video system in one of several scene modes; receiving specification data of one of several ambient light sources, the ambient light sources includes several specification data respectively, and the brightness setting values correspond to the scene modes and/or the specification data; and transmitting a corresponding brightness setting value to the ambient light source according to the set scene mode and the received specification data.

An embodiment of the disclosure discloses a control method of a video system. The control method includes setting the video system in one of several scene modes; transmitting information of the set scene mode to an ambient light source, the ambient light source stores several brightness setting values, and the brightness setting values correspond to the scene modes respectively; and setting the illumination intensity of the ambient light source to a corresponding brightness setting value according to the information of the set scene mode.

In the video system and the control method thereof according to the embodiments of the disclosure, the setting of the brightness corresponds to the scene mode of the video system and/or the specification data of the several ambient light sources, so that the video system can control the brightness of the ambient light source according to the set scene mode. Moreover, in the application of the video system and the control method for controlling the ambient light source according to the disclosure, when the ambient light source is in failure, a user can directly replace the light source with a new one without considering the specification of the light source or resetting relevant parameter values, thereby effectively solving the problem of inconvenient user operation.

BRIEF DESCRIPTION OF THE DRAWINGS

The disclosure will become more fully understood from the detailed description given herein below for illustration only, and thus are not limitative of the disclosure, and wherein.

DETAILED DESCRIPTION

The detailed features and advantages of the disclosure are described below in great detail in the following embodiments, the content of the detailed description is sufficient for persons skilled in the art to understand the technical content of the disclosure and to implement the disclosure there accordingly. Based upon the content of the specification, the claims, and the drawings, persons skilled in the art can easily understand the relevant objectives and advantages of the disclosure.

Figure 1:
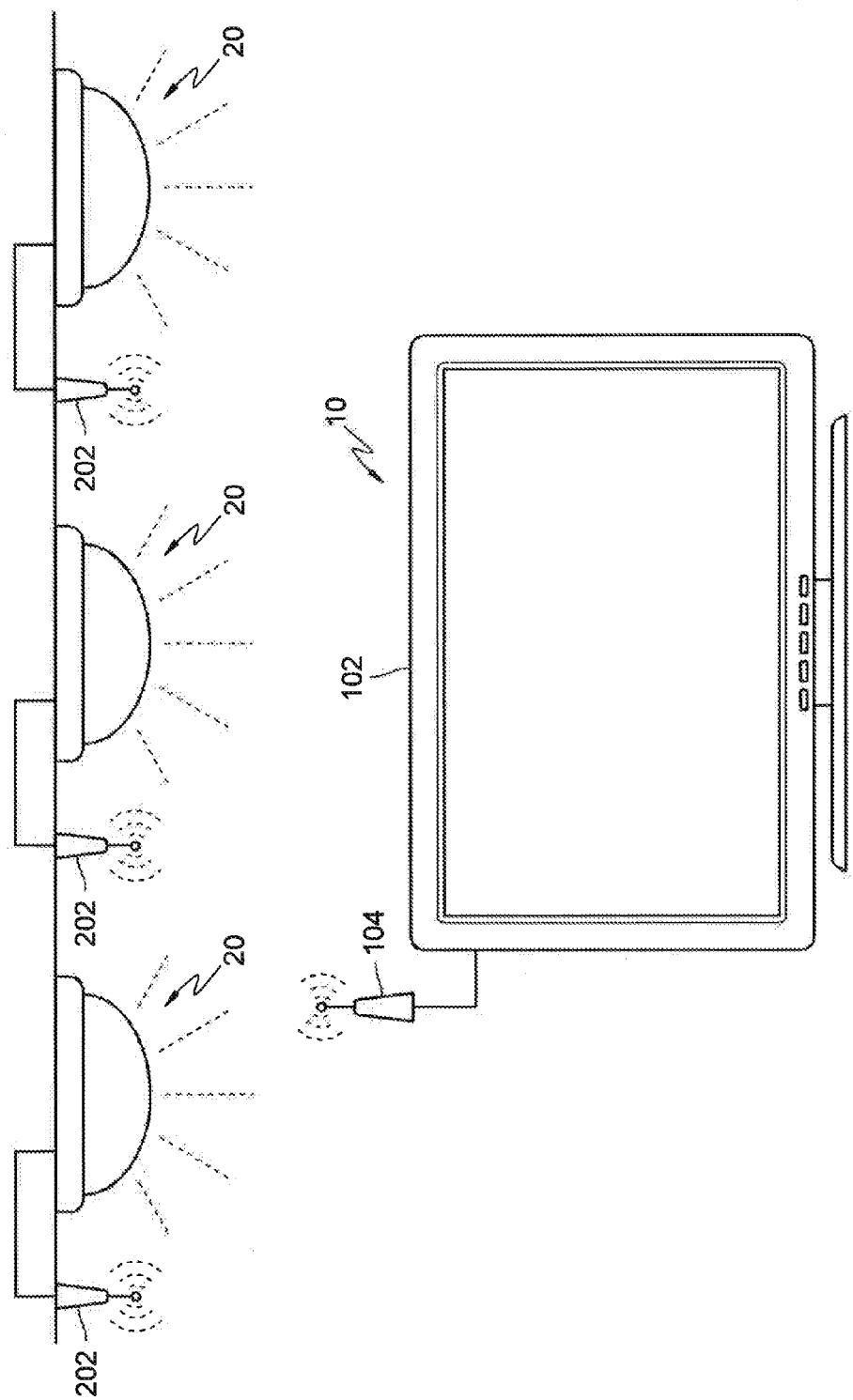
FIG. 1 is a schematic system diagram of a video system for controlling an ambient light source according to an embodiment of the disclosure.
Figure 2:
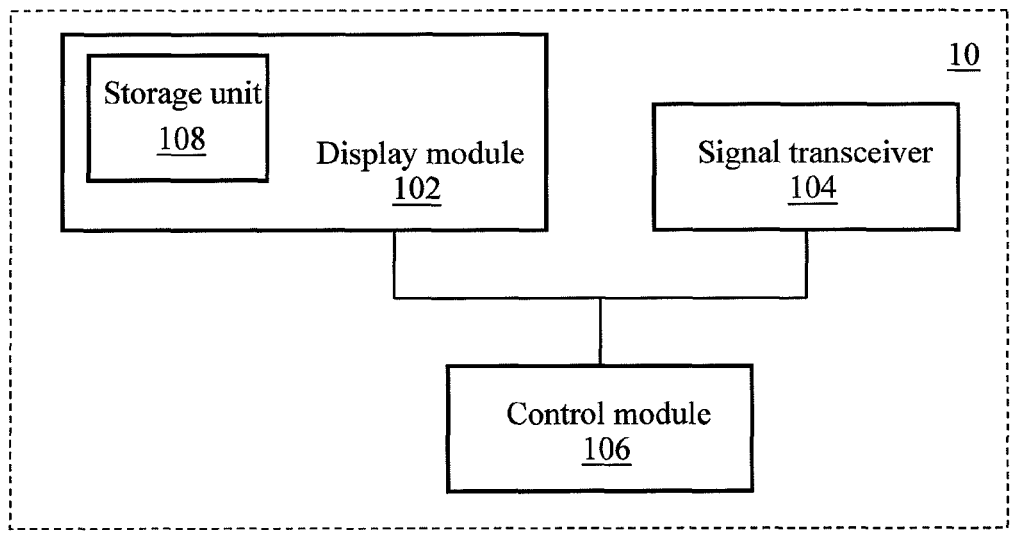
FIG. 2 is a circuit block diagram of a video system according to FIG. 1.

FIG. 1 is a schematic system diagram of a video system for controlling an ambient light source according to an embodiment of the disclosure. FIG. 2 is a circuit block diagram of a video system according to FIG. 1. The video system 10 may be set in several scene modes and control the illumination intensity of at least one ambient light source 20 according to the set scene mode. The video system 10 may be a flat-panel display or a three-dimensional liquid crystal display (3D LCD), but is not limited to the above-mentioned video system 10. In other embodiments of the disclosure, the video system 10 may also be implemented by using a personal computer (PC), a mobile phone, a portable game machine, or a personal mobile device. The ambient light source 20 of the disclosure generally refers to a light source that is not disposed in a display device, for example, an illumination light source in a living room.

For illustration of controlling the illumination intensity of the ambient light source 20 in the video system 10, reference may be made to FIG. 1 and FIG. 2. The details are described as follows.

The video system 10 comprises an image display module 102, a signal transceiver 104, and a control module 106. The ambient light source 20 has a signal transceiver 202 and the signal transceiver 202 is capable of communicating with the signal transceiver 104 of the video system 10. Therefore, the video system 10 and the ambient light source 20 may transmit signals to or receive signals from each other by the signal transceiver 202.

Moreover, the video system 10 further has a storage unit 108 for storing several brightness setting values. The brightness setting values correspond to the scene modes and/or several specification data respectively. The specification data refers to specification data of the ambient light source and is contained in the at least one ambient light source 20. Each of the specification data comprises information of light source power, brand name, or manufacturer name. The scene modes corresponding to the several brightness setting values are generally set by an On-Screen Display (OSD) system.

Figure 3:
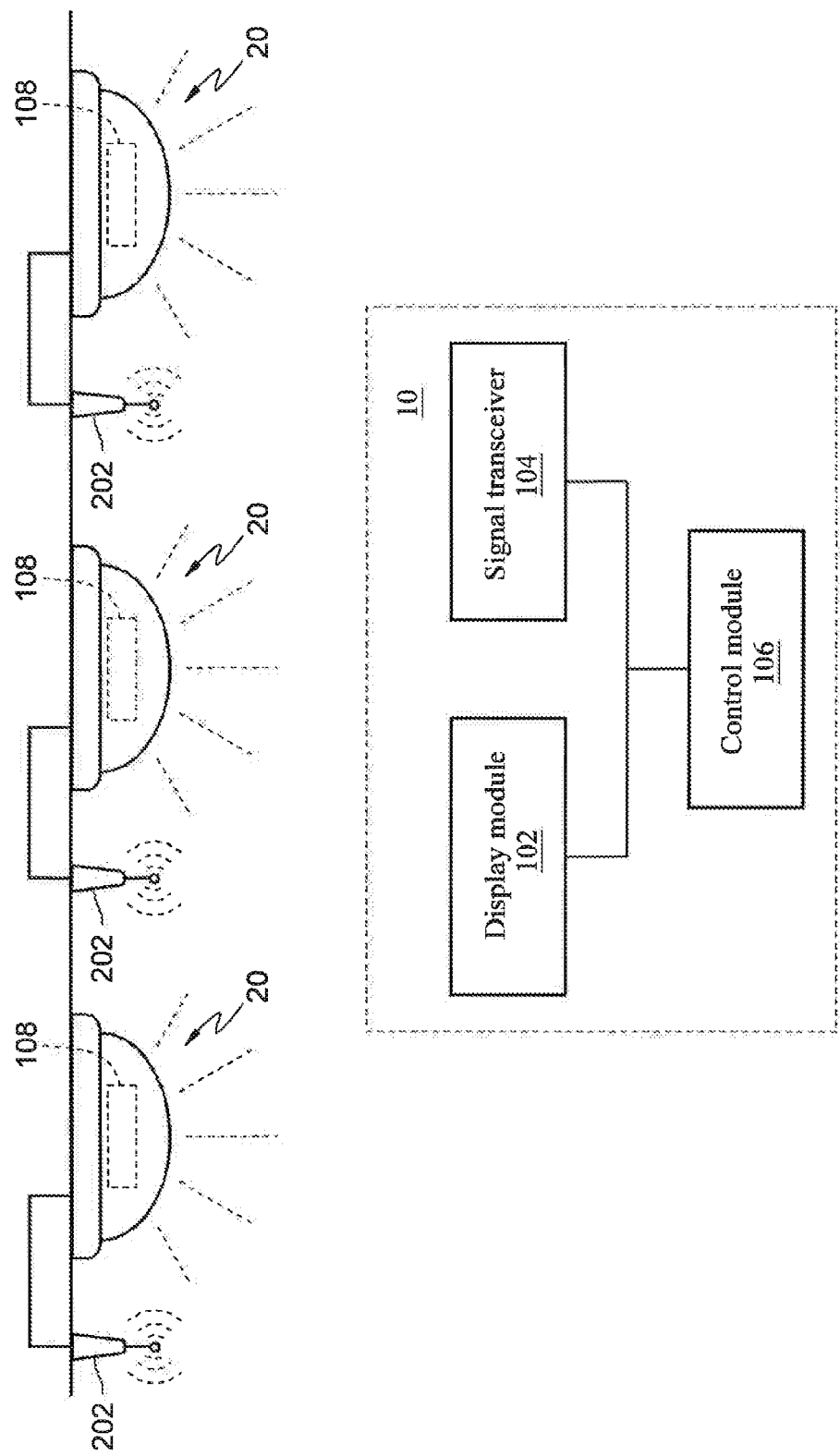
FIG. 3 is a circuit block diagram of a video system according to an embodiment of the disclosure.

In an embodiment, the storage unit 108 is disposed in the image display module 102, so the several brightness setting values corresponding to the several scene modes are stored in the image display module 102. In another embodiment, the storage unit 108 is disposed in the ambient light source 20 (such as an embodiment in FIG. 3, which is a circuit block diagram of a video system according to an embodiment of the disclosure), so the several brightness setting values corresponding to the several scene modes are stored in the ambient light source 20.

In an embodiment, the image display module 102 of the video system 10 is used for displaying a multimedia signal. The multimedia signal is generally formed by an image signal and/or a voice signal. The image display module 102 only displays the image signal in the multimedia signal. The signal transceiver 104 is built in the video system 10 and is connected in signal communication with the signal transceiver 202 of the ambient light source 20. According to other embodiments of the disclosure, the signal transceiver 104 may also be independent of the video system 10 and be electrically connected to the video system 10 by a wired or wireless transmitting and receiving device, thus being in signal communication with the ambient light source 20. The control module 106 is electrically coupled to the signal transceiver 104. After the signal transceiver 104 receives the specification data of the ambient light source 20, the control module 106 controls the signal transceiver 104 to transmit the corresponding brightness setting value in the storage unit 102 to the ambient light source 20 according to the set scene mode, so as to control the illumination intensity of the ambient light source 20.

In another embodiment, the control module 106 may also control the signal transceiver 104 to transmit the corresponding brightness setting value in the storage unit 102 to the ambient light source 20 only according to the set scene mode or the specification data of the ambient light source 20.

In an embodiment, the signal transceiver 104 communicates with the ambient light source by power line communication (PLC), wired network communication, or wireless network communication.

According to the embodiment of the disclosure, the ambient light source 20 may be externally connected to or built in a lamp with a dimming technique. The dimming mechanism may be Triac dimming, Pulse Width Modulation (PWM) dimming, electronic dimming, or step dimming.

Figure 4:
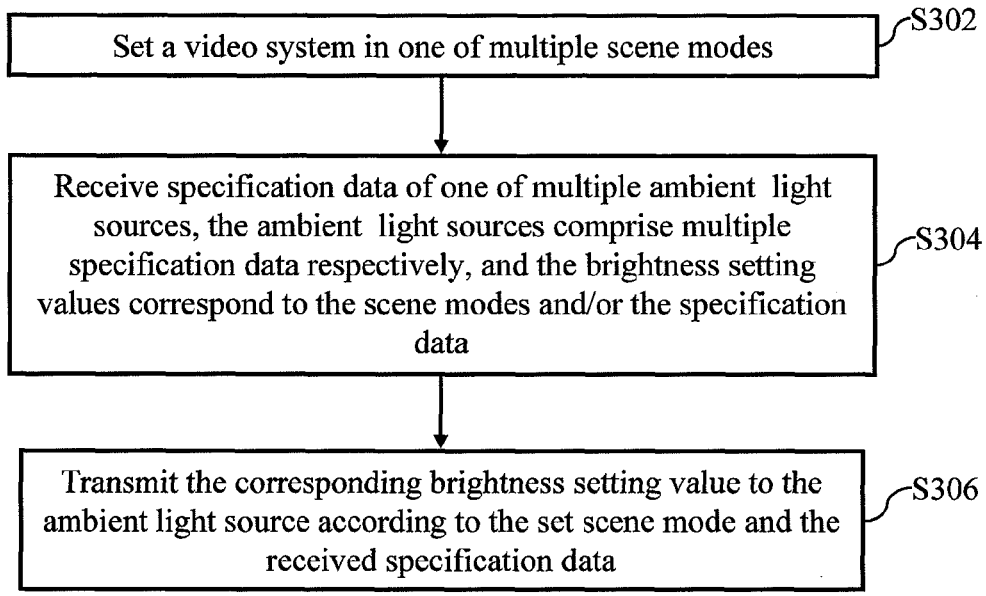
FIG. 4 is a flow chart of steps of a control method of the video system in FIG. 2 controlling an ambient light source.

FIG. 4 is a flow chart of steps of a control method of the video system in FIG. 2 controlling an ambient light source. FIG. 4 illustrates a control method for controlling an ambient light source 20 by using a video system 10. The video system 10 stores several brightness setting values. In particular, as described in Table 1, the video system 10 stores the brightness setting values, and each of the brightness setting values corresponds to the scene mode. The illumination intensity value is used to control illumination intensity of the ambient light source 20.

TABLE 1

| Brightness Setting Value of an Ambient Light Source Built In an Video System in Each Scene Mode | | | | | |
|---|---|---|---|---|---|
| Scene Mode | Standard | Film | Game | Show | Sport | Music |
| Brightness Setting Value | 80% | 30% | 90% | 100% | 70% | 50% |

In this embodiment, the video system 10 may be set in one of several scene modes (Step 302).

The video system 10 receives the specification data of the ambient light source 20 by the signal transceiver 104 (Step 304) that the ambient light sources comprise several specification data, and the brightness setting values correspond to the scene modes and/or the specification data. The specification data comprises information of light source power, brand name, or manufacturer name.

The video system 10 transmits a corresponding brightness setting value to the ambient light source according to the set scene mode and the received specification data (Step 306).

It should be noted that, in the embodiment of the disclosure, information may be delivered between the video system 10 and the ambient light source 20 in a wired or wireless manner. In an embodiment, when the information is delivered between the video system 10 and the ambient light source 20 in the wired manner, the information of the ambient light source 20 and a control signal output by the video system 10 may be transmitted by PLC or wired network communication. In another embodiment, when the information is delivered between the video system 10 and the ambient light source 20 in the wireless manner, the information of the ambient light source 20 and the control signal output from the video system 10 may be transmitted by a communication protocol such as Radio-Frequency Identification (RFID), Bluetooth (BT), or Wireless Fidelity (Wi-Fi).

Figure 5:
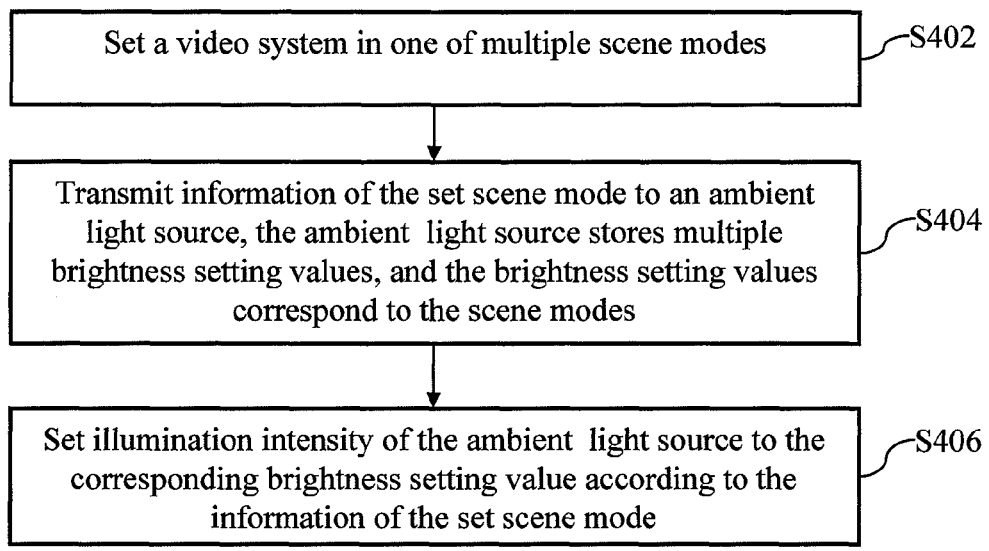
FIG. 5 is a flow chart of steps of a control method of the video system in FIG. 2 controlling an ambient light source.

FIG. 5 is a flow chart of steps of a control method of the video system in FIG. 2 controlling an ambient light source. FIG. 5 illustrates a control method for controlling an ambient light source 20 by using a video system 10 according to the disclosure, the ambient light source stores several brightness setting values. In this embodiment, the video system is set in one of several scene modes (Step 402). Information of the set scene mode is transmitted to an ambient light source, which stores several brightness setting values, and the several brightness setting values correspond to the scene modes respectively (Step 404). The illumination intensity of the ambient light source is set to the corresponding brightness setting value according to the information of the set scene mode (Step 406).

The video system according to the disclosure may exchange information with the ambient light source by a wired or wireless signal transceiver.

According to the control method in the disclosure, the illumination intensity for controlling the ambient light source corresponding to each of the scene modes may be obtained from the specification data of the ambient light source in the video system.

To sum up, in the video system and the control method for controlling the ambient light source according to the disclosure, the video system and the ambient light source are in two-way information communication. Moreover, in replacement of the ambient light source, the user can complete the original scene setting without resetting relevant setting values.

What is claimed is:

1. A video system, suitable for being set in one of a plurality of scene modes and controlling one of a plurality of ambient light sources, comprising:
   a storage unit, for storing a plurality of brightness setting values, wherein the brightness setting values correspond to the scene modes and/or a plurality of specification data respectively, and the specification data is stored in the ambient light sources respectively;
   a signal transceiver, for receiving the specification data from one of the ambient light sources; and
   a control module, electrically coupled to the signal transceiver, wherein the control module controls the signal transceiver to transmit a corresponding brightness setting value in the storage unit to the ambient light source according to the set scene mode and/or the received specification data.

2. The video system according to claim 1, wherein the signal transceiver communicates with the ambient light source through power line communication (PLC), wired network communication, or wireless network communication.

3. The video system according to claim 1, wherein each of the specification data comprises information of light source power, brand name, or manufacturer name.

4. A video system, suitable for being set in one of a plurality of scene modes, comprising:
   an ambient light source, having a storage unit, wherein the storage unit stores a plurality of brightness setting values and a plurality of specification data, wherein the brightness setting values correspond to the scene modes respectively;
   a signal transceiver; and
   a control module, electrically coupled to the signal transceiver, wherein the control module controls the signal transceiver to transmit information of the set scene mode to the ambient light source, and the ambient light source sets the illumination intensity to a corresponding brightness setting value according to the information of the set scene mode.

5. The video system according to claim 4, wherein the signal transceiver communicates with the ambient light source through power line communication (PLC), wired network communication, or wireless network communication.

6. The video system according to claim 4, wherein each of the specification data comprises information of light source power, brand name, or manufacturer name.

7. A control method of an video system, wherein the video system stores a plurality of brightness setting values, the control method comprising:
   setting the video system in one of a plurality of scene modes;
   receiving specification data from one of a plurality of ambient light sources, wherein the ambient light sources comprise a plurality of specification data respectively, and the brightness setting values correspond to the scene modes and/or the specification data; and
   transmitting a corresponding brightness setting value to the ambient light source according to the set scene mode and the received specification data.

8. The control method according to claim 7, wherein a signal transceiver communicates with the ambient light source through power line communication (PLC), wired network communication, or wireless network communication.

9. The control method according to claim 7, wherein each of the specification data comprises information of light source power, brand name, or manufacturer name.

10. A control method of an video system, comprising:
    setting the video system in one of a plurality of scene modes;
    transmitting information of the set scene mode to an ambient light source, wherein the ambient light source stores a plurality of brightness setting values and a plurality of specification data, wherein the brightness setting values correspond to the scene modes respectively; and
    setting the illumination intensity of the ambient light source to the corresponding brightness setting value according to the information of the set scene mode.

11. The control method according to claim 10, wherein a signal transceiver communicates with the ambient light source through power line communication (PLC), wired network communication, or wireless network communication.

12. The control method according to claim 10, wherein each of the specification data comprises information of light source power, brand name, or manufacturer name.

* * * * *